Jan. 26, 1965
A. ABRAMSON
3,167,467
ARTIFICIAL CHRISTMAS TREE BRANCH CONSTRUCTION
Filed May 18, 1961
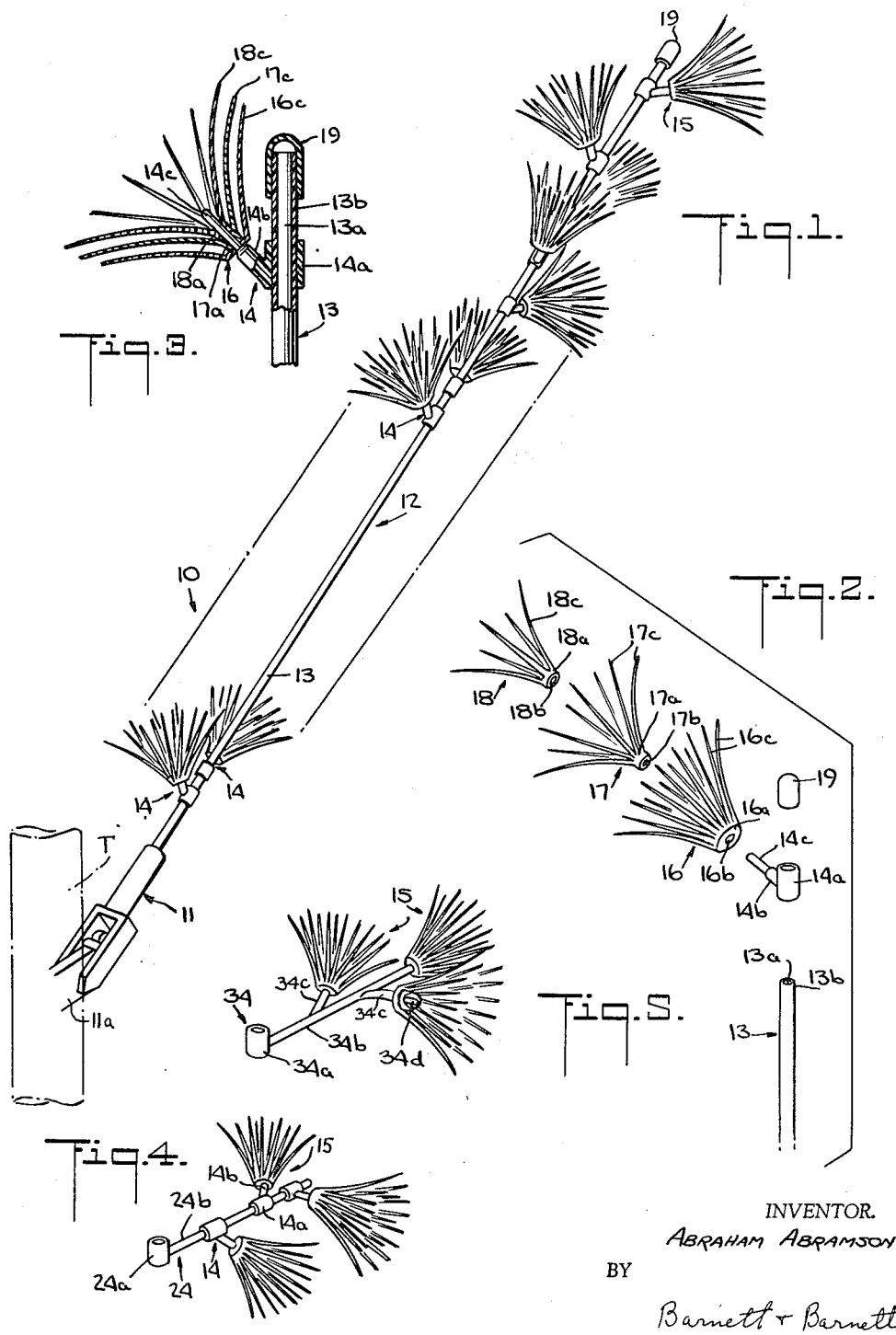
INVENTOR.
ABRAHAM ABRAMSON
BY
Barnett & Barnett
ATTORNEYS

United States Patent Office 3,167,467
Patented Jan. 26, 1965

3,167,467
ARTIFICIAL CHRISTMAS TREE BRANCH CONSTRUCTION
Abraham Abramson, New York, N.Y., assignor to Raylite Electric Corp., Bronx, N.Y., a corporation of New York
Filed May 18, 1961, Ser. No. 110,943
7 Claims. (Cl. 161—24)

This invention relates to ornamental and decorative artificial simulated Christmas tree constructions. More particularly, the invention is directed to improvements in the branch structure for such Christmas trees.

Among the objects of the invention is the general improvement of artificial simulated evergreen branch units of the character described for use primarily in combination with trunk elements of a knock-down Christmas tree assembly, which shall provide a simplified construction of few and easily assembled parts, which parts shall be economical to manufacture especially of molded resinous plastic in quantity production and readily assembled into a variety of sizes and configurations with a minimum of unskilled labor, which branch units shall be colorful and attractive in appearance, relatively light in weight, yet rugged to withstand breakage in periodic assembly and dismantling, which shall have electrical insulating properties for safety in mounting thereon electric wiring of decorative lighting outfits, and which shall be efficient and practical to a high degree in use.

Other objects of the invention will in part be obvious and in part hereinafter pointed out.

The invention accordingly consists of features of construction, combinations of elements and arrangements of parts which will be exemplified in the constructions hereinafter disclosed, the scope of the application of which will be indicated in the claims following.

In the accompanying drawing in which various embodiments of the invention are shown:

FIG. 1 is a perspective view partly in phantom of an artificial simulated Christmas tree branch construction embodying the invention shown seated in a branch holder element of a tree trunk quick detachable snap-in hinged mounting means more fully shown and described in my copending application entitled Decorative Simulated Christmas Tree Constructions, Ser. No. 78,938, filed December 28, 1960, now U.S. Patent No. 3,115,435.

FIG. 2 is an exploded view of an upper end of the branch construction illustrated in FIG. 1 showing details of the leaf elements and method of assembly.

FIG. 3 is an enlarged fragmentary view of the upper end of the branch construction illustrated in FIG. 1 with parts in section to show details of construction.

FIG. 4 is a modified form of collar and leaf holder for use on the branch construction shown in FIG. 1 providing sub-branches for fuller foliage effect, and FIG. 5 is another modified form of collar and leaf holder.

Referring in detail to the drawing, 10 denotes a detachable branch unit comprising a branch holder 11 in which is seated an artificial simulated Christmas tree branch 12 embodying the invention. Holder 11 may be constructed for quick detachable snap-in hinged mounting on a bearing plate 11a supported by tree trunk T in the manner fully shown and described in my said copending application.

Branch 12 is shown in FIGS. 1, 2 and 3 as a rod 13 simulating a stem and being of substantially uniform circular cross-section along the length thereof, rod 13 being formed as a core 13a preferably of metal stock to impart rigidity surrounded by sheath 13b of a resinous plastic material, such as polyethylene. A plurality of leaf units 14 are mounted in spaced relation along the length of rod 13, each comprising a collar 14a having a short stem 14b extending laterally and forwardly therefrom, that is, preferably at an acute angle with respect to the free end of rod 13. Each short stem 14b may terminate in a projection 14c on which a plurality of leaf or needle members 16, 17 and 18 are nested in axial alignment forming a needle tuft 15.

As is clear from FIGS. 2 and 3, needle members 16, 17 and 18 may differ individually from each other in construction and in the number of needles to render, when assembled on projection 14c, the intended appearance of a simulated needle tuft 15. Thus, lowermost member 16 may have a central disc 16a formed with a center opening 16b and a plurality of needles 16c extending laterally and forwardly from the periphery of disc 16a at an acute angle to projection 14c. Intermediate needle member 17 and uppermost member 18 may have central short sleeves 17a and 18a formed with bores 17b and 18b, respectively, needles 17c and 18c extending laterally and forwardly from the upper end of sleeves 17a and 18a, respectively, the latter, as is clear from FIG. 3, forming spacer elements to separate needles 16c, 17c and 18c from each other. The overall diameters of disc 16a and sleeves 17a and 18a are of decreasing relative sizes for nesting, opening 16b and bores 17b and 18b being sized to friction fit on projection 14c. A cap or finial 19 may terminate the free end of rod 13 to simulate a bud or otherwise serve as decoration in the manner hereinafter described.

The practical utility of branch unit 10 will now be apparent. The parts having been previously fabricated as hereinbefore described and shown in the drawing, rod 13 being made in convenient lengths and leaf unit 14, needle members 16, 17 and 18, and finial 19 being made preferably by injection molding of suitable resinous plastic, such as polyethylene, assembly of branch unit 10 is readily accomplished. Rod 13 is first cut to a desired length which will vary with requirements depending on the overall size of tree and the relative intended position of the branch on the tree. Leaf unit 14 may be previously assembled with needle members 16, 17 and 18 friction fitted in nested relation on projection 14c forming a needle tuft 15. Branch 12 is then assembled by force sliding collars 14a of leaf units 14 onto rod 13, each collar 14a being properly spaced from adjacent collars and oriented to position each tuft 15 to extend in a desired lateral direction as shown in FIG. 1. Collars 14a are sized to be slidable along rod 13 but are friction fit snugly enough to prevent undesirable displacement either axially along rod 13 or pivotally thereabout. The lower end of branch 12 after assembly with leaf units 14 is then seated in holder 11, the connection between branch 12 and holder 11 being either a friction fit or bonded with a suitable adhesive. Cup shaped finial 19 is then seated on the upper end of branch 12 to complete the assembly of unit 10.

Where the Christmas tree design requires denser foliage, one or more sub-stem units 24, shown in FIG. 4, may be mounted on rod 13 in any desirable position therealong to provide a branched effect to unit 10. To this end sum-stem unit 24 is formed with a collar 24a similar to collar 14a of leaf unit 14 for mounting on rod 13. An elongated stalk 24b is integrally formed to laterally extend from collar 24a and may be sized diametrically mounting a plurality of leaf units 14 therealong.

FIG. 5 shows a modified form of sub-stem 34 having a collar 34a and a stalk 34b with a plurality of integrally molded spaced short stems 34c, each terminating in a projection 34d on which needle members 16, 17 and 18 may be nested to form tuft 15.

The improved construction of Christmas tree branch 12 provides a wide latitude of versatility. Thus, rod 13 may be cut from relatively long preformed lengths to a wide range of required sizes. Any number of leaf units 14 may be mounted on such cut rods 13 and oriented to render a desired design effect. Providing sheath 13b and leaf units 14, that is, collar 14a, short stem 14b and projection 14c in the same color, such as brown, the needle members 16, 17 and 18 in green and finial 19 in red is found to result in an attractive branch particularly suitable for Christmas trees.

Sub-stem units 24 or 34 provide in a simple and relatively inexpensive manner additional versatility of design which can readily be varied in the home in accordance with individual tastes.

The term "laterally and obliquely" is used in the claims to designate the angular disposition of short stems 14b and projections 14c with respect to the axis of rod 13 and also the angular disposition of needles 16c, 17c and 18c with respect to the axes through center opening 16b and bores 17b and 18b, respectively.

It is thus seen that there is provided an artificial Christmas tree branch construction in which the several objects of the invention are achieved and which is well adapted to meet conditions of practical use.

As various possible embodiments might be made in the above invention, and as various changes might be made in the construction above set forth, it is to be understood that all the matters herein set forth or shown in the accompanying drawing are to be interpreted as illustrative and not in a limiting sense.

Having thus described my invention, I claim as new and desire to secure by Letters Patent:

1. A simulated evergreen branch construction comprising an elongated rod having mounted therealong a plurality of short stems extending laterally therefrom and terminating in a projection of reduced diameter, a plurality of needle members each having a central portion with a plurality of needles extending laterally and forwardly about the periphery thereof, said needle members being mounted in nested relation on said projection to form a tuft.

2. A simulated evergreen branch construction comprising an elongated rod of predetermined length and substantially uniform cross-section, a plurality of leaf units each having a collar friction fit for adjustable positioning along the rod, each collar having a short stem extending laterally therefrom and terminating in a projection of reduced diameter, a plurality of needle members each having a central portion with a plurality of needles extending laterally and forwardly about the periphery thereof, said needle members being mounted in nested relation on said projection to form a tuft.

3. A simulated evergreen branch construction comprising an elongated rod having a plurality of short stems extending laterally and obliquely therefrom and terminating in a projection, a plurality of needle members forming a tuft mounted on said projection, a first of said members formed as a disc with integral needles extending laterally and obliquely from the periphery thereof, another of said members being formed as a sleeve with integral needles extending laterally and obliquely from one end thereof and nested with respect to said first member, said sleeve serving to space the respective needles from each other.

4. A simulated evergreen branch construction comprising an elongated rod of predetermined length and substantially uniform cross-section, a plurality of leaf units each having a collar friction fit for adjustable positioning along the rod, each collar having a short stem extending laterally and obliquely therefrom and terminating in a projection, a plurality of needle members forming a tuft mounted on said projection, a first of said members formed as a disc with integral needles extending laterally and obliquely from the periphery thereof, another of said members being formed as a sleeve with integral needles extending laterally and obliquely from one end thereof and nested with respect to said first member, said sleeve serving to space the respective needles from each other.

5. In a simulated evergreen branch construction comprising an elongated rod of predetermined length and substantially uniform cross-section and a plurality of leaf units each having a collar friction fit for adjustable positioning along the rod, a sub-stem unit having a collar for mounting by friction fit adjustability along said rod spaced from said leaf unit collars, said sub-stem collar being integrally formed with an elongated stalk extending laterally therefrom, and a second plurality of leaf units each having a collar friction fit for adjustable positioning along said stalk.

6. In a simulated evergreen branch construction comprising an elongated rod of predetermined length and substantially uniform cross-section and a plurality of leaf units each having a collar friction fit for adjustable positioning along the rod, a sub-stem unit having a collar for mounting by friction fit adjustability along said rod spaced from said leaf unit collars, said sub-stem collar being integrally formed with a stalk having spaced short stems extending laterally therefrom and terminating in projections, a plurality of needle members each having a central portion with a plurality of needles extending laterally and obliquely about the periphery thereof, said needle members being mounted in nested relation on said projections to form tufts.

7. A simulated evergreen branch construction comprising an elongated rod formed with a metal core and a plastic sheath, said rod being of predetermined length and substantially uniform cross-section, a plurality of leaf units of molded plastic each having a collar friction fit for adjustable positioning along the rod, each collar having a short stem extending laterally and obliquely therefrom and terminating in a projection, a plurality of needle members, each of molded plastic and forming a tuft mounted on said projection, a first of said members formed as a disc with integral needles extending laterally and obliquely from the periphery thereof, another of said members being formed as a sleeve with integral needles extending laterally and obliquely from one end thereof, the other end abutting said disc.

References Cited in the file of this patent
UNITED STATES PATENTS

| | | |
|---|---|---|
| 2,826,846 | Warren | Mar. 18, 1958 |
| 2,893,149 | Reece et al. | July 7, 1959 |
| 2,984,036 | Adler | May 16, 1961 |
| 3,011,280 | Keidd | Dec. 5, 1961 |